E. S. GRAHAM.
TRUCK BODY.
APPLICATION FILED DEC. 6, 1920. RENEWED MAR. 11, 1922.

1,432,329.

Patented Oct. 17, 1922.
2 SHEETS—SHEET 1.

INVENTOR
E. S. Graham
By
ATTORNEY.

E. S. GRAHAM.
TRUCK BODY.
APPLICATION FILED DEC. 6, 1920. RENEWED MAR. 11, 1922.
1,432,329.
Patented Oct. 17, 1922.
2 SHEETS—SHEET 2.
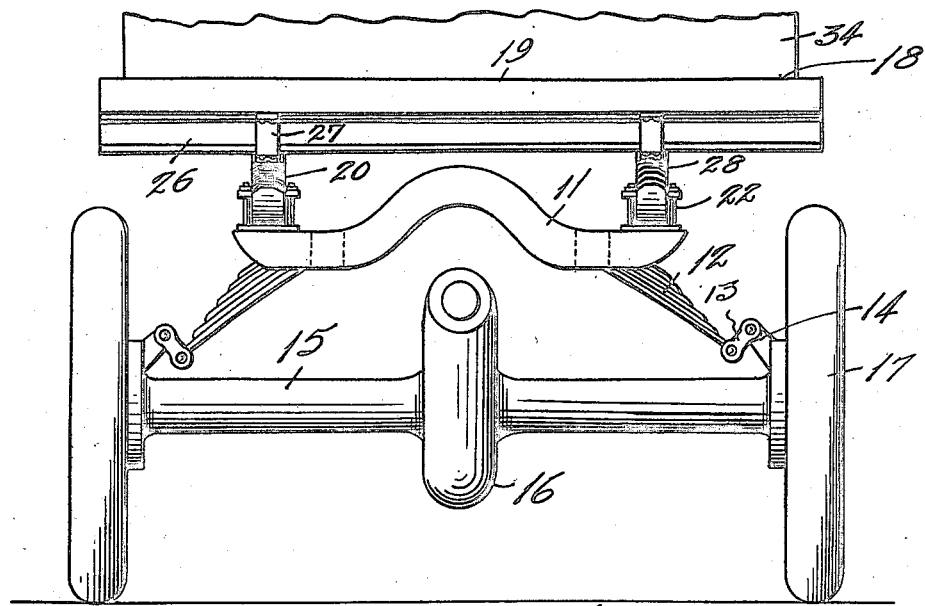
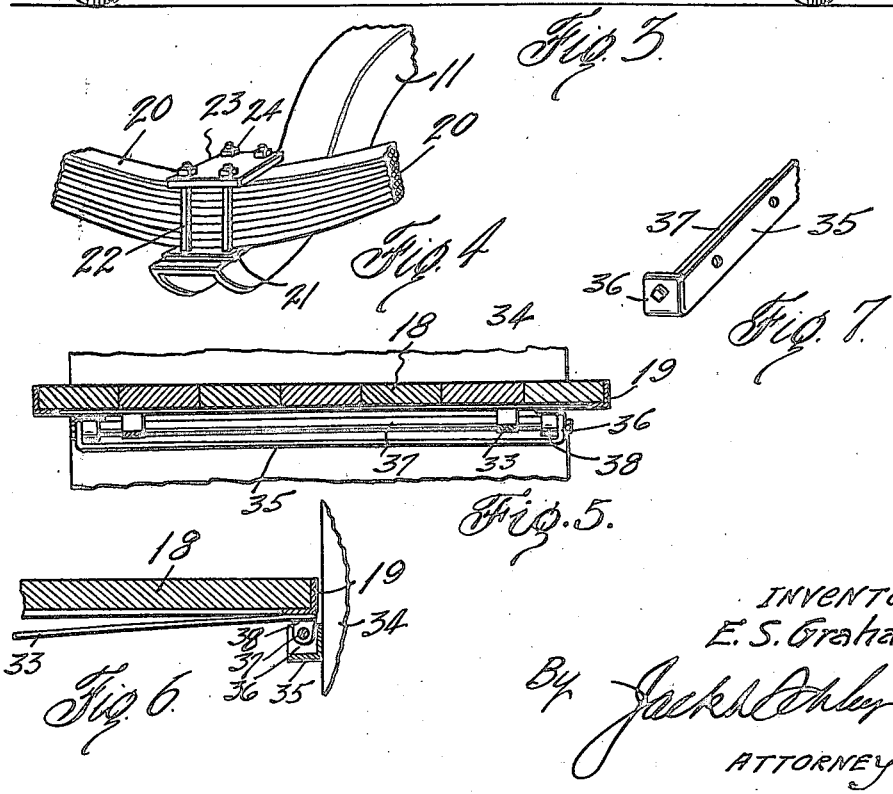
INVENTOR
E. S. Graham
By
ATTORNEY.

Patented Oct. 17, 1922.

1,432,329

UNITED STATES PATENT OFFICE.

EARL S. GRAHAM, OF DALLAS, TEXAS, ASSIGNOR TO ROBERTS WHEEL & BODY WORKS, OF DALLAS, TEXAS, A COPARTNERSHIP COMPOSED OF EARL S. GRAHAM, G. M. CHISHOLM, E. P. BENNETT, T. P. STEGER, T. N. TACKETT, SR., AND T. N. TACKETT, JR.

TRUCK BODY.

Application filed December 6, 1920, Serial No. 428,548. Renewed March 11, 1922. Serial No. 543,091.

*To all whom it may concern:*

Be it known that I, EARL S. GRAHAM, a citizen of the United States, residing at Dallas, in the county of Dallas and State of Texas, have invented certain new and useful Improvements in Truck Bodies, of which the following is a specification.

This invention relates to new and useful improvements in truck bodies.

It has been customary to mount certain types of light truck bodies upon rigid sills and bolsters and to fasten these upon the frame of the truck. While the rear end of the truck frame is always supported upon the rear axle by springs, these axle springs have carried the load at the rear end and the platform of the body has been rigidly sustained above these axle springs. The result has usually been, excessive wear on the rear tires, more or less trouble or wear upon the differential and a racking and disintegration of the truck body due to the severe jolting and vibration, for the reason that the axle springs must be made strong enough to carry the load and by increasing the strength of the axle springs, their resiliency is decreased to a considerable extent.

The purpose of my invention is to eliminate to a large extent the foregoing objections by supporting the truck body resiliently on the frame, whereby the body will be cushioned and the jolting and vibration absorbed to a large extent before being transmitted to the running gear. One of the objects of the invention is to mount the truck body in such a manner that the load will be properly sustained and the platform of the body adequately supported and mounted so as to not only carry the load, but to independently swing under the influence of said load.

A construction designed to carry out the invention will be hereinafter described together with other features of the invention.

Figure 1:
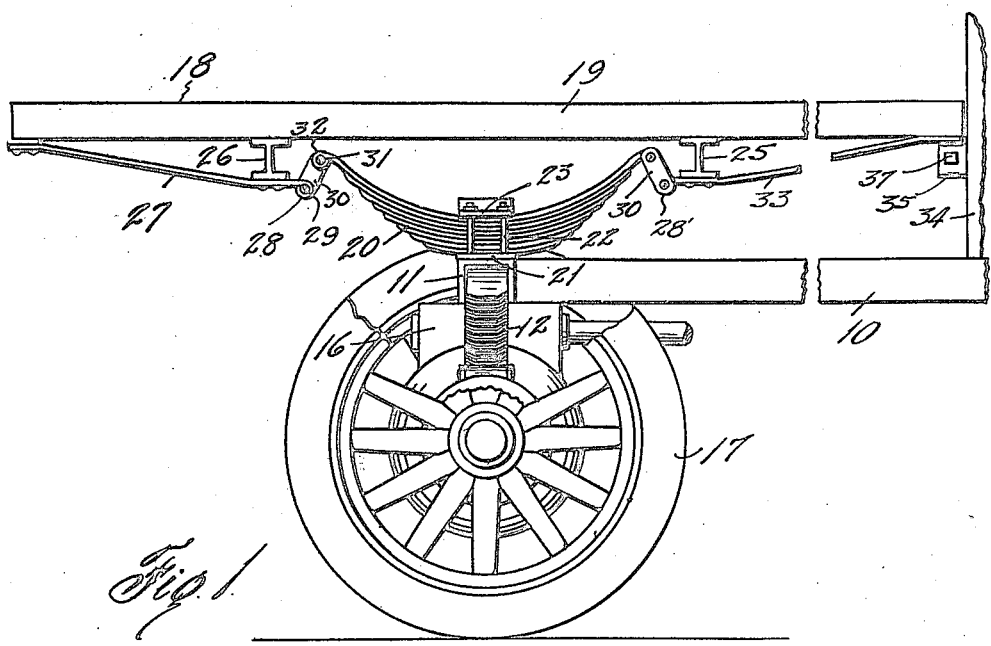
Figure 2:
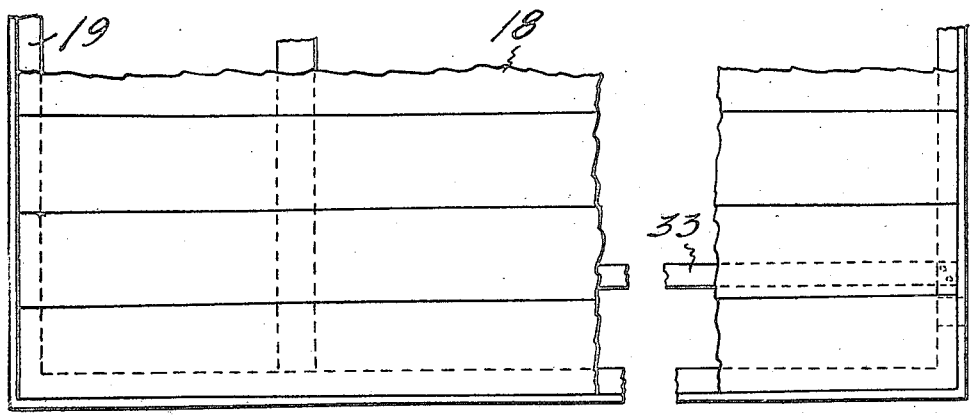

The invention will be more readily understood from a reading of the following specification and by reference to the accompanying drawings, in which an example of the invention is shown, and wherein:

Fig. 1 is a side elevation of the rear portion of a truck equipped with a body constructed in accordance with this invention, Fig. 2 is a partial plan view of the platform of the truck body, Fig. 3 is a rear elevation of the construction shown in Fig. 1, Fig. 4 is a perspective view showing the manner of fastening the body springs, Fig. 5 is a transverse sectional view at the forward end of the body showing the pivotal mounting for the same, Fig. 6 is a sectional detail of the same mounting, and Fig. 7 is an isometric detail of the angle member of the pivotal mounting.

In the drawings the numeral 10 designates the frame of a motor truck which has its rear end connected by a transverse channel yoke 11. The ends of the yoke carry depending spring sections 12, which are known as the axle springs. The lower ends of the springs 12 are supported in hangers 13 and these are pivotally supported by lugs 14 mounted at each end of the axle housing 15. The housing 15 has the usual differential 16 at its center and the rear wheels 17 at its ends. The parts which have been described are of the usual construction and form no particular part of the invention, but are merely used in connection therewith.

In illustrating the invention I have shown a platform 18 with a marginal frame 19 formed of angle irons, but have not attempted to illustrate or describe the details of its construction, it being understood that the platform may be used with stakes (not shown) or may have any kind of a superstructure which is desired, built thereupon. The essense of the invention lies in the manner of mounting and sustaining the platform. At each end of the channel yoke 11, I mount a semi-elliptical spring 20 at right angles to said yoke and parallel with the frame of the truck. Each spring is built up of several leaves so as to give it the required strength as well as resiliency. The manner of mounting the springs is best shown in Fig. 4. Each spring at its center is mounted on a base plate 21 which latter is suitably fastened on the yoke. A pair of bolts 22 extend upwardly on each side of the springs from the base plate and pass through a cap plate 23 extending across the top of the springs. Nuts 24 mounted on the upper ends of the bolts serve to fasten the top plate down upon the spring, whereby the spring is securely clamped between the plates 21 and 23 as is obvious.

Near the front ends of the springs I fasten a transverse I-beam or bolster 25 to the underside of the platform 18; while at the rear ends of the springs 20 I mount a bolster 26 on the underside of the platform. From the rear bolster 26 a pair of braces 27 extend rearwardly to the frame 19 of the platform and have their rear ends suitably fastened to the underside of the rear end of said frame. The forward end of each brace 27 is suitably fastened to the underside of the bolster 26 and has its portion extending forwardly of said bolster, curved downwardly and formed into an eye 28 which receives a bolt 29. A spring hanger 30 has its lower ends pivoted on the bolt 28 and carries a second bolt or pin 31 at its upper ends receiving the eye 32 of the adjacent spring 20. This construction is duplicated at the front end of each spring where the bolt 29 is mounted in an eye 28' formed on the rear end of a brace 33 secured to the bolster 25. The brace 33 extends forwardly and is fastened to the front edge of the angle frame 19 of the platform. The hangers form a pivoted supporting connection between the springs 20 and the platform whereby the latter is supported.

It is obvious that the platform must be pivoted at its front end so as to swing when the springs 20 yield. To the rear side of the cab 34 which is mounted on the frame 10, an angular bracket 35 is rigidly fastened. The ends of this bracket are bent upwardly to form ears 36, which support the ends of a transverse rod 37 as is best shown in Figs. 5, 6 and 7. A pair of ears 38 depend from the underside of the front end of the frame 19 and are pivoted on the rod 37, said ears 38 engaging the inner sides of the ears 36, whereby the platform is held against lateral displacement. By this arrangement the front end of the platform is pivotally mounted and the platform may swing freely up and down as the springs 20 are manipulated. It will be seen that the bolsters 25 and 26 strengthen and support the platform, extending to the outer edges thereof. The braces 27 support the rear end of the platform and the braces 33 lend stability to the forward portion of said platform. It will be seen that the springs 20 cushion the load carried by the platform and thus relieve the springs 12 of this burden to a large extent. When the rear wheels 17 pass over an obstruction or are given a jolt, the shock resulting from the displacement of the load, is sustained by the springs 20 and substantially absorbed; with the result that it is not transmitted to the housing 15 and the differential 16. It is further pointed out that a peculiar pounding or hammering of the rear end of the truck which is present where the body is rigidly mounted on the frame, is by this improved resilient mounting, eliminated, because the springs 12 take care of the cushioning of the frame and the springs 20 sustain the impact of the load carried by the platform. A truck body mounted in accordance with this invention will not only afford easier riding, but will prolong the life of the truck.

Various changes and modifications within the spirit of the invention may be made without departing from its scope.

What I claim, is:

1. In a truck body, the combination with a wheel supported frame, of a pair of semielliptical springs, clamps for securing the springs to the rear end of the frame, a platform having its forward end pivotally supported on the frame, a pair of transverse bolsters depending from the platform, braces secured to the underside of the platform and having their inner ends fastened to the bolster, and hangers pivotally connected with the inner ends of the braces and the outer ends of the springs.

2. In a vehicle, a frame including a transverse rear yoke, an axle housing arranged beneath the yoke, springs connecting the yoke with the axle housing, semielliptical springs mounted upon the ends of the yoke and extending transversely thereof and longitudinally of the frame, an upstanding support secured to the forward portion of the frame, a platform arranged above the semielliptical springs having its forward end pivotally connected with the upstanding support to swing in a substantially vertical plane, a pair of bolsters arranged upon opposite sides of the semielliptical springs and secured to the lower side of the platform to support and strengthen the same, diagonal brace elements extending longitudinally of the platform and secured to the ends thereof and extending inwardly beyond the bolsters and secured thereto, and means connecting the ends of the semielliptical springs with the inner ends of the brace elements.

In testimony whereof I affix my signature.

EARL S. GRAHAM.